United States Patent
Nuissl et al.

(10) Patent No.: US 8,317,403 B2
(45) Date of Patent: Nov. 27, 2012

(54) ROLLING BEARING WITH A SPLIT BEARING RING

(75) Inventors: Christian Nuissl, Nuernberg (DE); Joerg Schuh, Emskirchen (DE); Juergen Stoelzle, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 293 days.

(21) Appl. No.: 12/678,716

(22) PCT Filed: Aug. 6, 2008

(86) PCT No.: PCT/EP2008/060317
§ 371 (c)(1),
(2), (4) Date: Jul. 1, 2010

(87) PCT Pub. No.: WO2009/037047
PCT Pub. Date: Mar. 26, 2009

(65) Prior Publication Data
US 2010/0284643 A1 Nov. 11, 2010

(30) Foreign Application Priority Data
Sep. 19, 2007 (DE) .......................... 10 2007 044 776

(51) Int. Cl.
*F16C 33/60* (2006.01)
(52) U.S. Cl. ........................................ 384/506; 384/539
(58) Field of Classification Search .......... 384/499–506, 384/510–515, 537, 539
See application file for complete search history.

(56) References Cited

U.S. PATENT DOCUMENTS

| | | | |
|---|---|---|---|
| 3,918,776 A | 11/1975 | Zimmer et al. | |
| 4,682,901 A * | 7/1987 | Hauber | 384/539 |
| 4,708,499 A * | 11/1987 | Loser et al. | 384/539 |

FOREIGN PATENT DOCUMENTS

| | | |
|---|---|---|
| DE | 68 00 671 | 1/1969 |
| DE | 19 01 381 | 7/1970 |
| DE | 71 42 627 | 2/1972 |
| DE | 22 34 984 A | 2/1974 |
| DE | 74 07 839 | 7/1975 |
| DE | 24 50 321 | 5/1976 |
| DE | 94 11 276 | 10/1994 |
| DE | 102 20 419 | 11/2003 |

* cited by examiner

*Primary Examiner* — Thomas R Hannon
(74) *Attorney, Agent, or Firm* — Lucas & Mercanti, LLP; Klaus P. Stoffel

(57) ABSTRACT

A rolling bearing, with a bearing inner and outer ring where at least one of the bearing rings is split, in a parting plane which is normal with respect to an axis, into two ring halves of identical shape. Latching members are integrally formed on a radially inner or radially outer ring part. Segment-like and shell-shaped projections project axially beyond the ring part at a part of the circumferential extent thereof. The projections are arranged in a different radial plane to the latching members, which projections are delimited in the circumferential direction by segment-like depressions and the projections of one ring half engage into the depressions, which are of complementary shape, of the other ring half, such that the projections and the ring part overlap in the axial direction and the latching members of the one ring half engage into clearances which are arranged in the other ring part.

11 Claims, 8 Drawing Sheets

ROLLING BEARING WITH A SPLIT BEARING RING

This application is a 371 of PCT/EP2008/060317 filed Aug. 6, 2008, which in turn claims the priority of DE 10 2007 044 776.2 filed Sep. 19, 2007, the priority of both applications is hereby claimed and both applications are incorporated by reference herein.

FIELD OF THE INVENTION

The invention relates to a rolling bearing with a bearing inner ring and a bearing outer ring, at least one of which is formed as a plastics injection molding, and with rolling elements, which roll on a raceway of the bearing inner ring and on a raceway of the bearing outer ring, at least one of the bearing rings being split in an axially normal parting plane into two ring halves of identical shape, which are held against one another with a form fit, elastically formed latching members which protrude beyond the parting plane and are formed in one piece on both ring halves interacting with clearances arranged in both ring halves.

BACKGROUND OF THE INVENTION

Rolling bearings made of plastic have already been known for some considerable time for various applications, as evidenced by DE 19 01 381 A, DE 24 50 321 A, DE 68 00 671 U, DE 71 42 627 U, DE 74 07 839 U, DE 94 11 276 U1 and DE 102 20 419 A1.

A rolling bearing formed like the type in question is known from DE 22 34 984 A. As disclosed by the description and the single FIGURE, the inner bearing ring comprises two ring halves of identical shape made of plastic, the parting plane of which extends normal to the axis. At least three latching members protruding beyond this parting plane are produced in one piece with each of the ring parts. In each ring part there is a respective recess between these latching members, which recesses are dimensioned and arranged in such a way that the latching members lie in them without any play when the ring parts are pushed axially together. After yielding on account of their elasticity, the latching members thereby engage with hooks attached to their free ends behind latching areas, which are provided in an axially normal sense in the recesses, so that the two ring parts are held in abutment and form the inner bearing ring as a unit.

A disadvantage of this is that the latching elements must absorb radial and axial forces as well as tipping moments within the split bearing ring. This has the consequence that the latching elements on the one hand must be elastic, to make it possible for them to snap easily into place, but on the other hand must also have great stiffness, to allow forces to be absorbed at all. Forming the latching elements in this way, i.e. both very flexible and very stiff, is a paradox, because increasing the size of the latching elements in the circumferential direction has the effect of impairing their flexibility. It is also disadvantageous that the latching elements described in this prior publication cannot rule out play between the two inner ring halves, which has adverse effects on the bearing arrangement.

SUMMARY OF THE INVENTION

Against the background of the disadvantages of the known prior art, the invention is therefore based on the object of forming the split bearing ring of a rolling bearing of the type in question in such a way that on the one hand all bearing forces occurring are reliably absorbed and on the other hand the bearing arrangement is held together well.

This object is achieved according to the invention on the basis of the preamble of claim 1 in conjunction with the precharacterizing clause thereof by the latching members being formed on a radially inner or radially outer ring part, segment-like and shell-shaped projections projecting in the axial direction beyond the ring part at a part of the circumferential extent thereof, and said projections being arranged in a different radial plane and being delimited in the circumferential direction by segment-like depressions, and the projections of one ring half engaging in the depressions of a complementary form of the other ring half, so that the projections and the ring part overlap in the axial direction and the latching members of one ring half engage in clearances arranged in the other ring part.

The invention makes it possible for the two ring halves to be assembled to form a bearing ring by simply pushing the segment-like shell-shaped projections into the segment-like depressions, the latching elements snapping into place once the projections and depressions are in axial abutment. In this way, separate absorption of forces acting on the bearing by different bearing parts is possible. While the radial forces and the tipping moments are reliably absorbed by projections, recesses and ring parts, the axial forces are absorbed by the latching members. Since the axial forces only make up a small part of the overall forces, the latching members can be formed in a correspondingly filigree manner, and consequently very flexibly, which has advantageous effects on the latching process. In other words, particularly easy latching of the latching members into the recesses provided is obtained.

According to a further feature as claimed in claim 2, the bearing outer ring is of a split form, the ring part of each ring half being provided at two opposing circumferential points with latching members which engage in the clearances of a complementary form of the other ring parts and the two ring halves being arranged offset in relation to one another in the circumferential direction by 90°.

This creates two identical ring halves which can be produced in a simple way by an injection molding process and can also be connected in a simple way to form a unit by pushing them axially one onto the other.

According to a further feature of the invention as claimed in claim 3, it has proven to be expedient in this context that each ring half is provided with a radially inwardly directed flange, so that a gap seal is formed with the bearing inner ring. The advantage is that dirt is prevented from penetrating from the outside inward into the interior of the bearing and lubricant is prevented from escaping to the outside from the interior of the bearing.

According to a further feature as claimed in claim 4, it has proven to be expedient that the rolling bearing is formed as a four-point ball bearing, the bearing balls of which are arranged as a full complement. In this way it is possible to simplify the assembly of the overall bearing arrangement, because the absence of a bearing cage dispenses with an assembly step and, furthermore, increased load absorption is made possible by the full complement type of rolling.

According to another additional feature as claimed in claim 5, it is intended that the two ring halves receive an elastically formed casing between them at their outer circumferential surface. This casing ensures that particularly smooth, damped and consequently low-vibration running of the bearing arrangement is possible. In this case, the rolling bearing is formed as a running roller, the outer ring of which rotates.

A further variant of the invention emerges from claim 6. According to this, it is provided that the bearing inner ring is split, the ring part of each ring half being provided at two opposing circumferential points with latching members which engage in the clearances of a complementary form of the other ring parts and the two ring halves being arranged offset in relation to one another in the circumferential direction by 90°.

According to a further feature as claimed in claim 7, it has proven to be advantageous in the case of a bearing inner ring split in two that each ring half is provided with a radially inwardly directed flange, so that a gap seal is formed with a bearing outer ring.

According to an additional further feature as claimed in claim 8, it is also to be regarded as an advantage that the rolling bearing is formed as a double-row angular ball bearing, the bearing balls of which are arranged as a full complement. In this way it is possible to absorb forces reliably in both axial directions, the full complement type of rolling also allowing high radial forces to be absorbed.

As also in the case of a single-row deep groove ball bearing, it is of advantage in the case of the double-row angular ball bearing that, as claimed in claim 9, the bearing outer ring is provided with at least one recess in which an O-ring is arranged, which in turn ensures particularly quiet and vibration-damped running of the bearing arrangement. Also in this case, the rolling bearing is formed as a running roller, the outer ring of which rotates.

According to another feature as claimed in claim 10, it is provided that the latching member has a hook, the latching area of which runs at an angle of <90° with respect to a bearing axis and which interacts with an identically inclined latching area of the clearance. The advantage of this additional configurational variant is that, when receiving a shaft, the latching members are moved outward in the radial direction and ensure by way of the inclined areas that the two ring halves are moved toward one another in the axial direction, which has advantageous effects on the prestressing of the bearing.

Finally, according to a last feature of the invention as claimed in claim 11, it is intended that the rolling elements are produced from a nonmetallic material. Conceivable in this case are plastics, glass materials and ceramic materials, silicon nitride being of particular significance in the case of the latter. Such rolling elements are always required when antimagnetic properties of the bearing arrangement are demanded.

Further features of the invention emerge from the following description and from the drawings, in which two exemplary embodiments of the invention are represented in a simplified form.

DETAILED DESCRIPTION OF THE DRAWINGS

Figure 1:
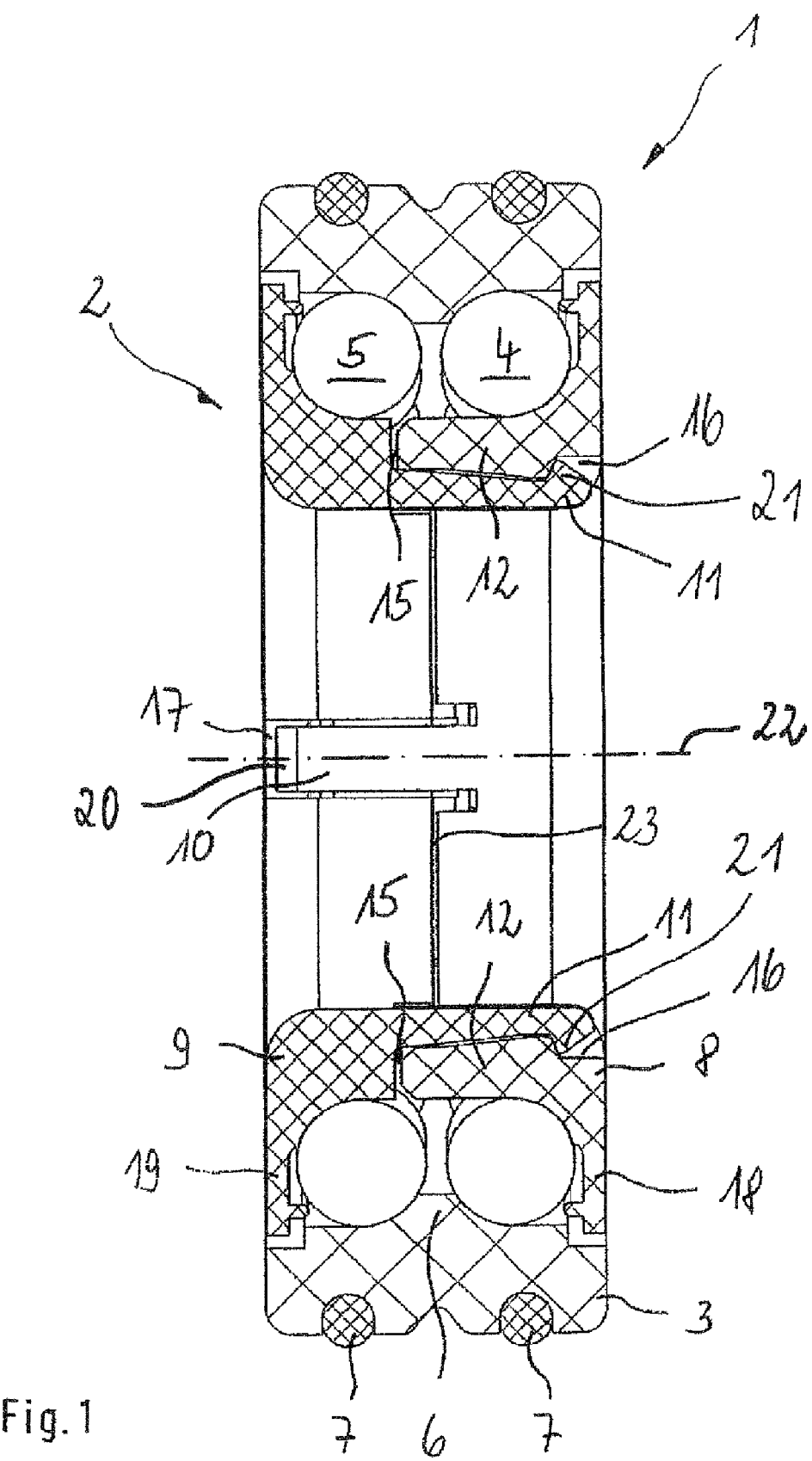
FIG. 1 shows an axial section through a double-row angular ball bearing formed according to the invention, in the region of the latching members.
Figure 1A:
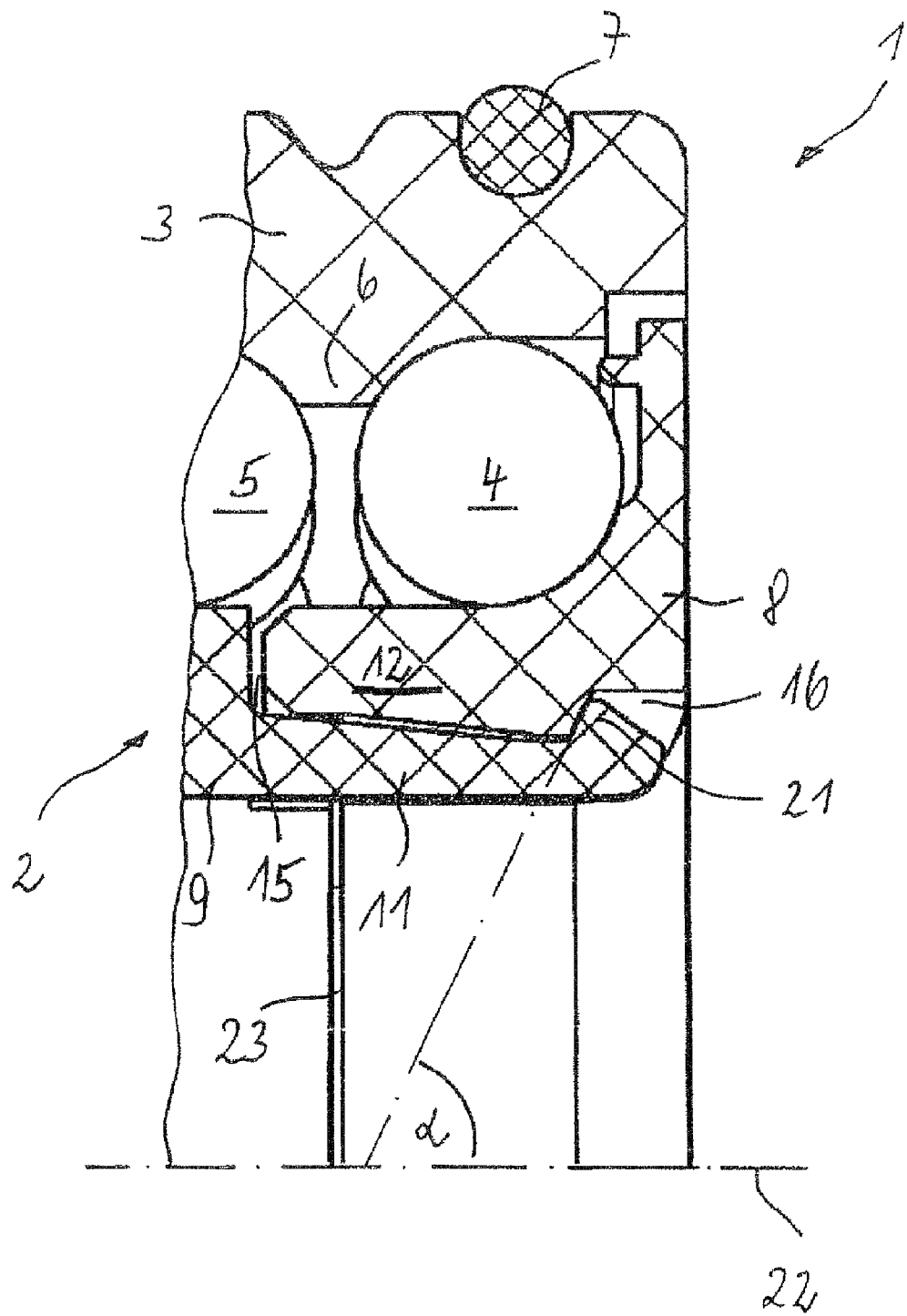
FIG. 1a shows an enlarged representation in the region of the latching members as shown in FIG. 1.
Figure 2:
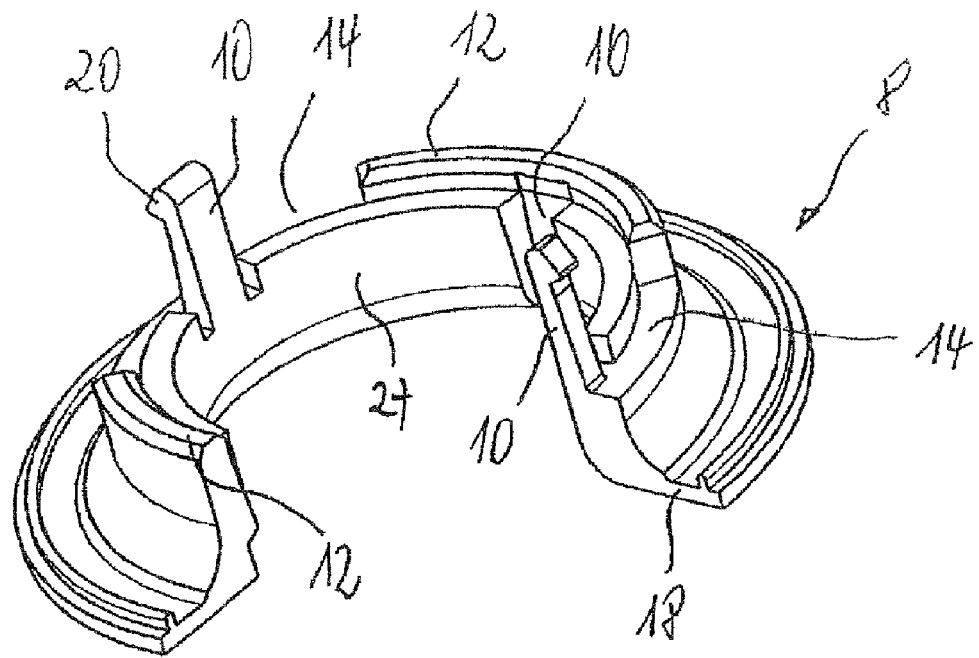
FIG. 2 shows a perspective representation of two ring halves of the split bearing inner ring with and without bearing balls as shown in FIG. 1, partly in section.
Figure 2:
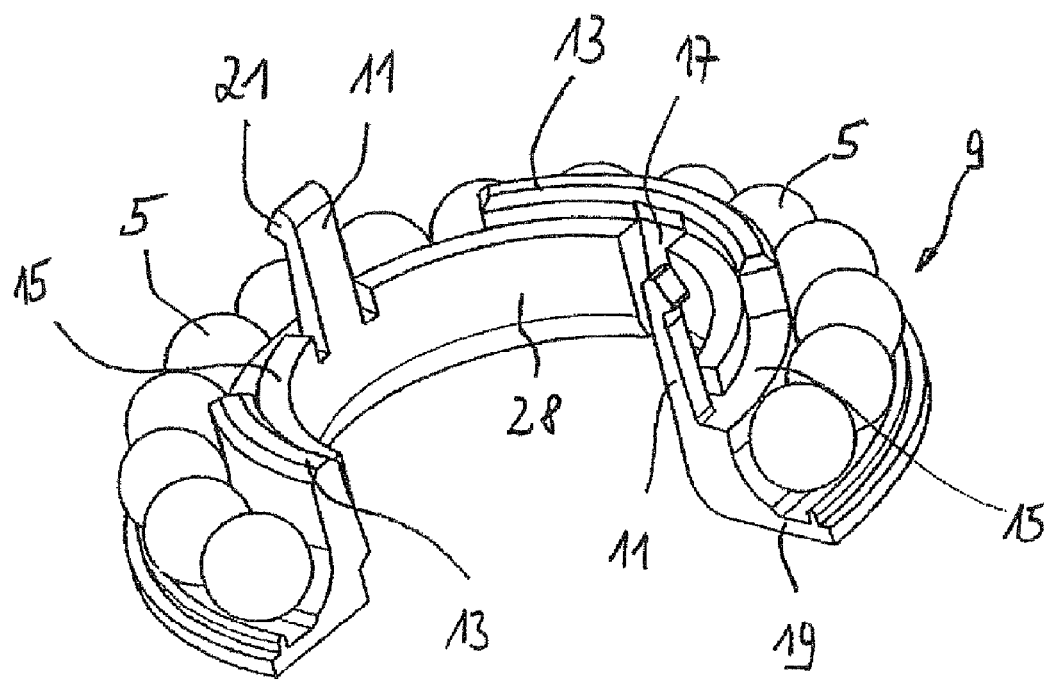
Figure 3:
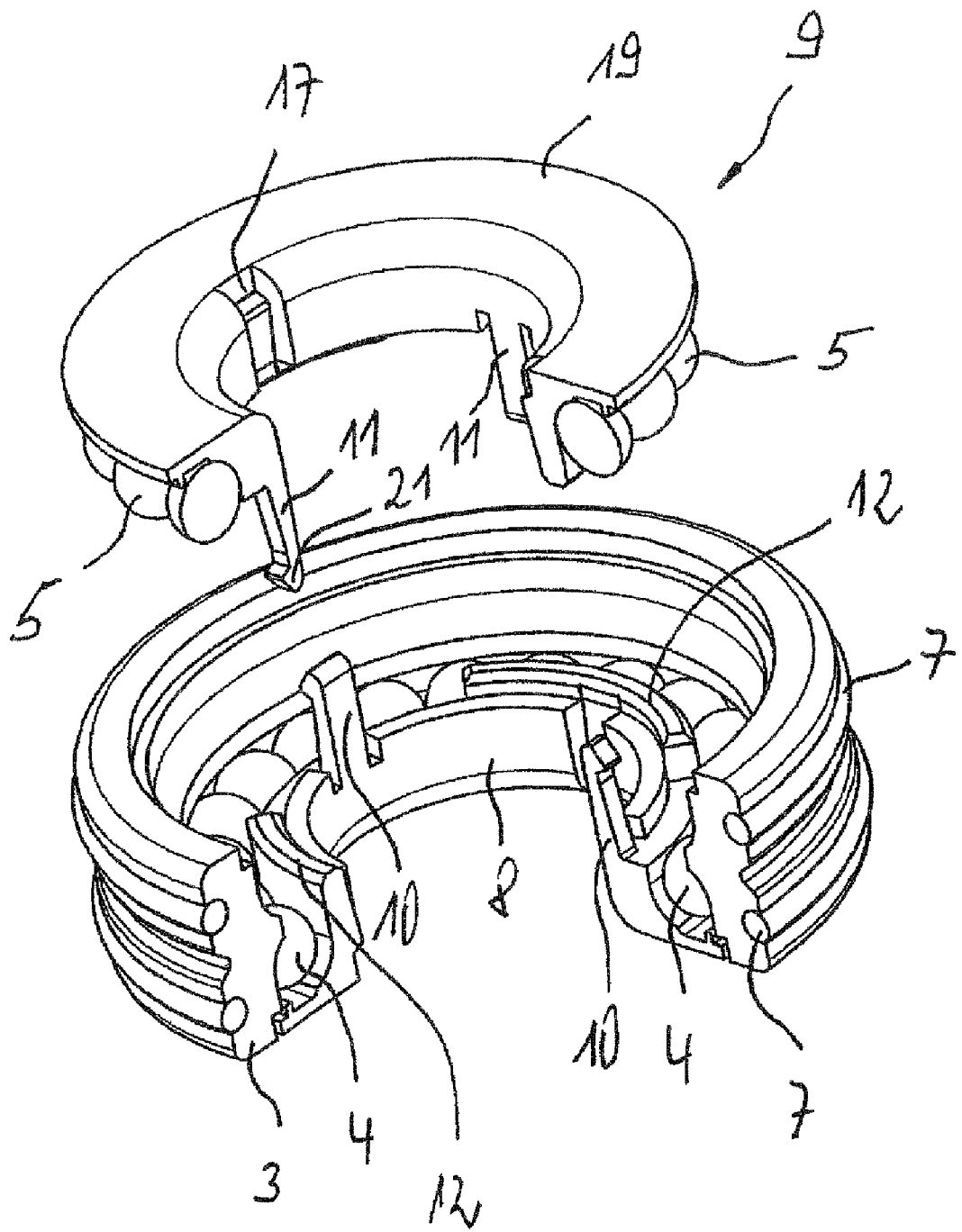
FIG. 3 shows a perspective representation of the bearing as shown in FIG. 1 in a partly assembled state, partly in section.
Figure 4:
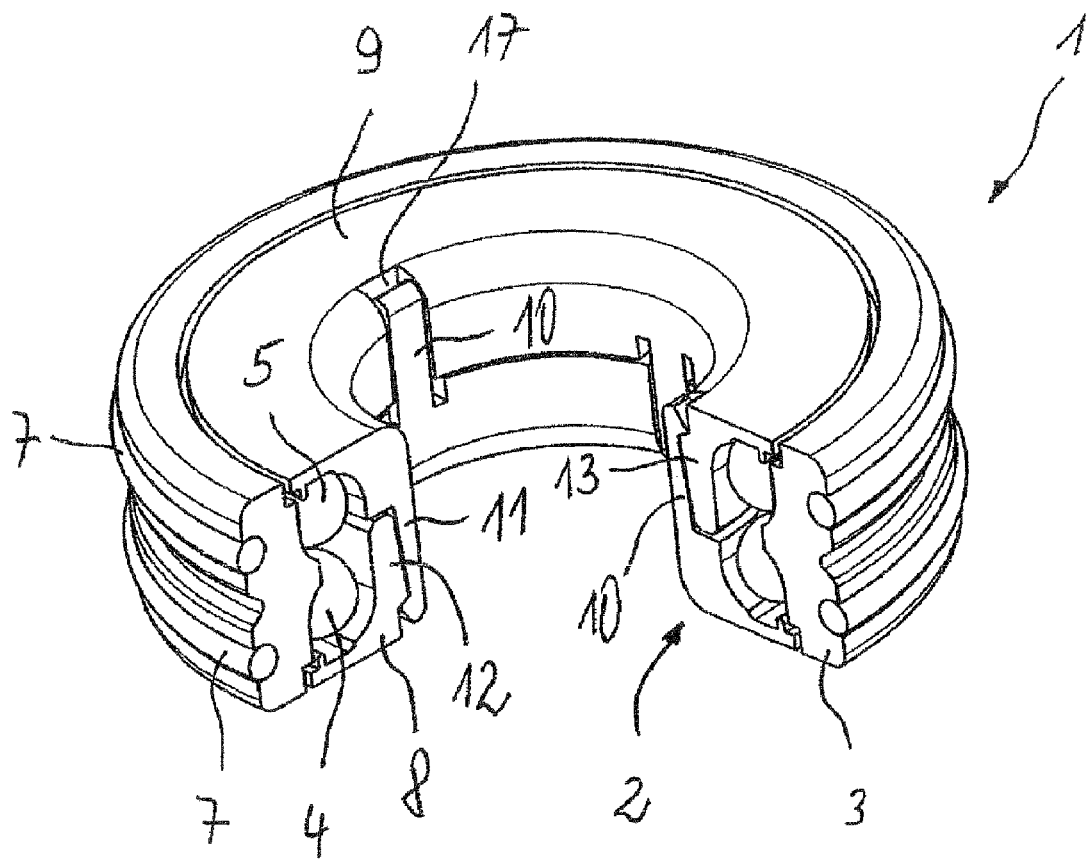
FIG. 4 shows a perspective representation of the bearing arrangement as shown in FIG. 1 in the completely assembled state, partly in section.

As can be seen from FIGS. 1 to 4, in particular from FIGS. 1 and 1a, the double-row angular ball bearing 1 comprises the bearing inner ring 2, of a two-part form, and the one-part bearing outer ring 3, between which the two rows of balls 4, 5 roll on raceways not designated any more specifically, the bearing balls of which rows are arranged as a full complement, the rows of balls 4, 5 being kept at a distance by the radially inwardly directed projection 6 of the bearing outer ring 3. The bearing outer ring 3 has recesses, which are not designated any more specifically, are spaced apart from one another in the axial direction and in which two elastic O-rings 7 are arranged.

As can also be seen, the two-part bearing inner ring 2 comprises the two ring halves 8, 9, which are produced as injection moldings and are of an identical shape, i.e. identically formed, and lie against one another in the parting plane 23. Each ring half 8, 9 is provided with two respective latching members 10, 11, which are arranged at two opposing circumferential points, i.e. are offset in relation to one another by 180°. The latching members 10, 11 are formed on the ring part 27, 28, segment-like and shell-shaped projections 12, 13 projecting in the axial direction beyond the ring part 27, 28 at a part of the circumferential extent thereof. The shell-like projections 12, 13 are in this case arranged lying opposite one another in the circumferential direction and in a different radial plane than the ring parts 27, 28, i.e. they lie outward behind the ring parts 27, 28 in the radial direction. The two projections 12, 13 are separated from one another in the circumferential direction by segment-like depressions 14, 15, with in turn two identical depressions 14, 15 of the two ring halves 8, 9 respectively lying opposite one another. In this case, the two ring halves 8, 9 interact in such a way that the projections 12 of the ring half 8 engage in the depressions 15 of the ring half 9 and the projections 13 of the ring half 9 engage in the depressions 15 of the ring half 8. The latching members 10, 11 in this case each engage in a clearance 16, 17, which is arranged in the ring part 27, 28. Each ring half 8, 9 is provided with a radially outwardly directed flange 18, 19, so that a gap seal, not designated any more specifically, is formed with the outer ring 3.

As can be seen from the enlarged representation in FIG. 1a, each latching member 10, 11 has a respective hook 20, 21, which is directed radially outward and the latching area of which runs at an angle α of <90° with respect to the bearing axis 22 and interacts with an identically directed latching area of the clearance 16, 17. In this way it is ensured that, when a shaft (not represented) is pushed into the bearing inner ring 2 of a two-part form, the initially radially inwardly directed latching members 10, 11 are pressed radially outward and, by interaction of the two latching areas, move the two ring halves 8, 9 toward one another in the axial direction, so that they lie firmly against one another and in this way have an effect on the prestressing of the bearing.

Figure 5:
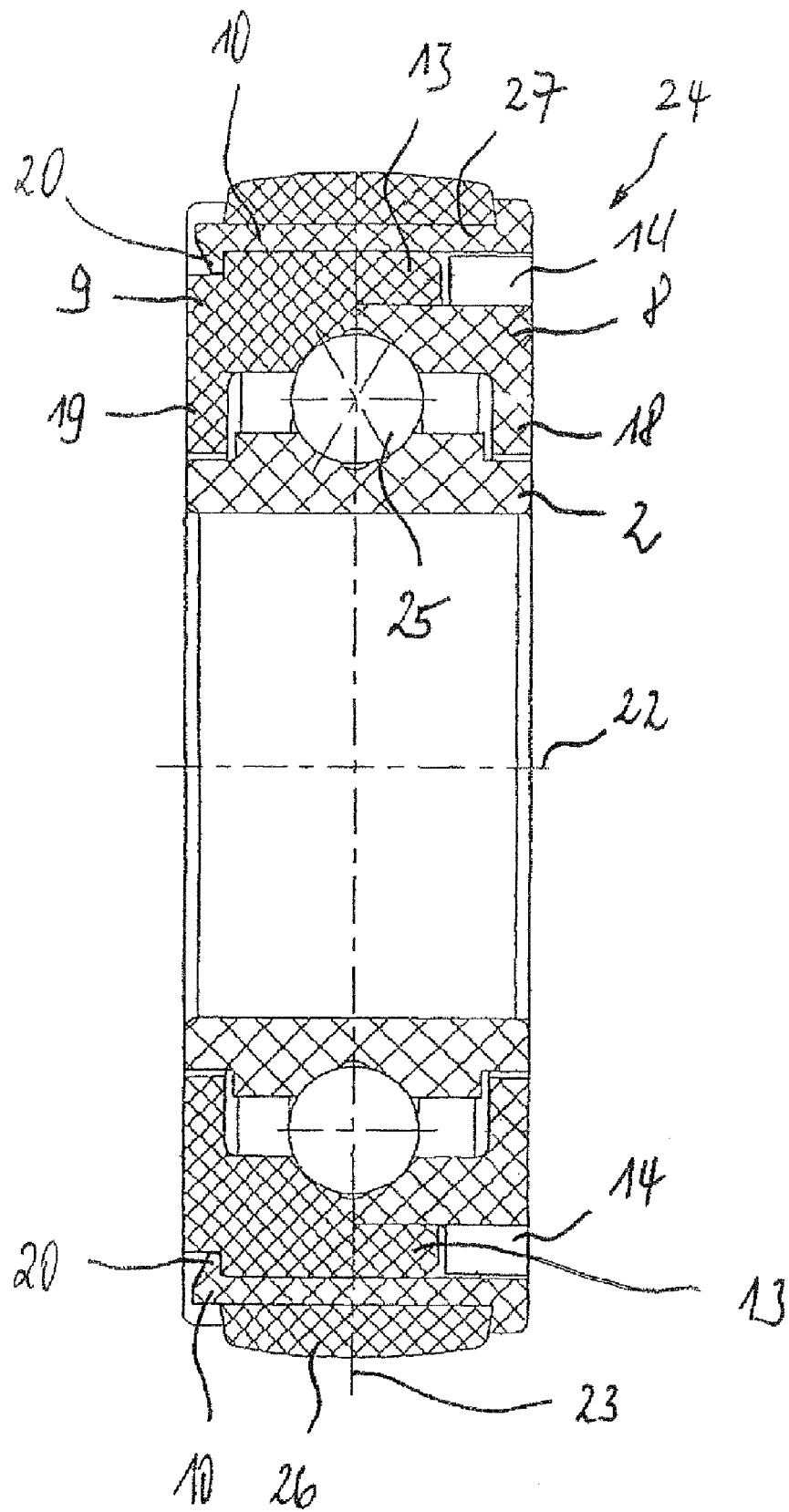
FIG. 5 shows an axial section through a ball bearing formed according to the invention with a split outer ring.
Figure 6:
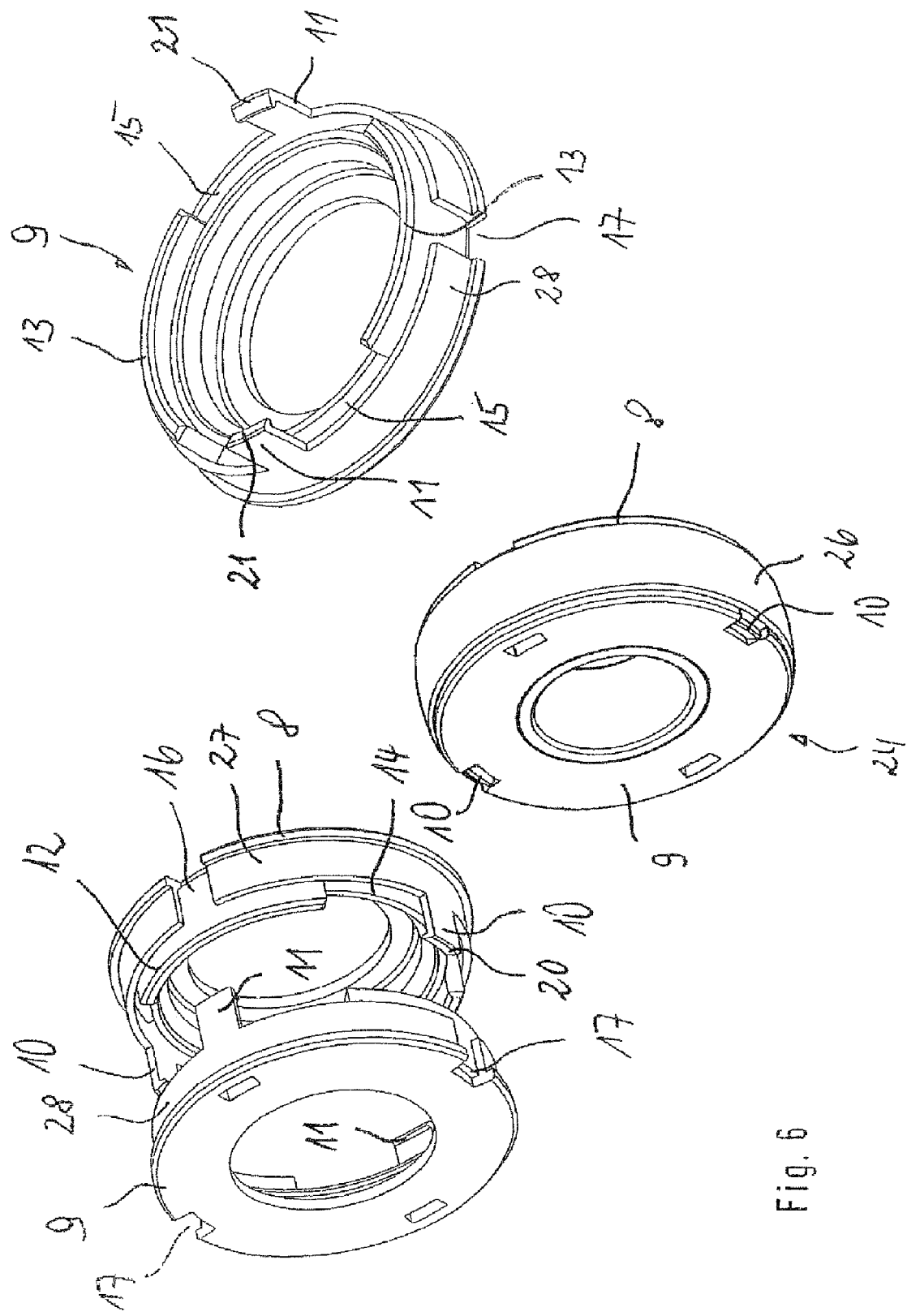
FIG. 6 shows a perspective representation of the split bearing outer ring from FIG. 5 before and after the snapping together of the ring halves.
Figure 7:
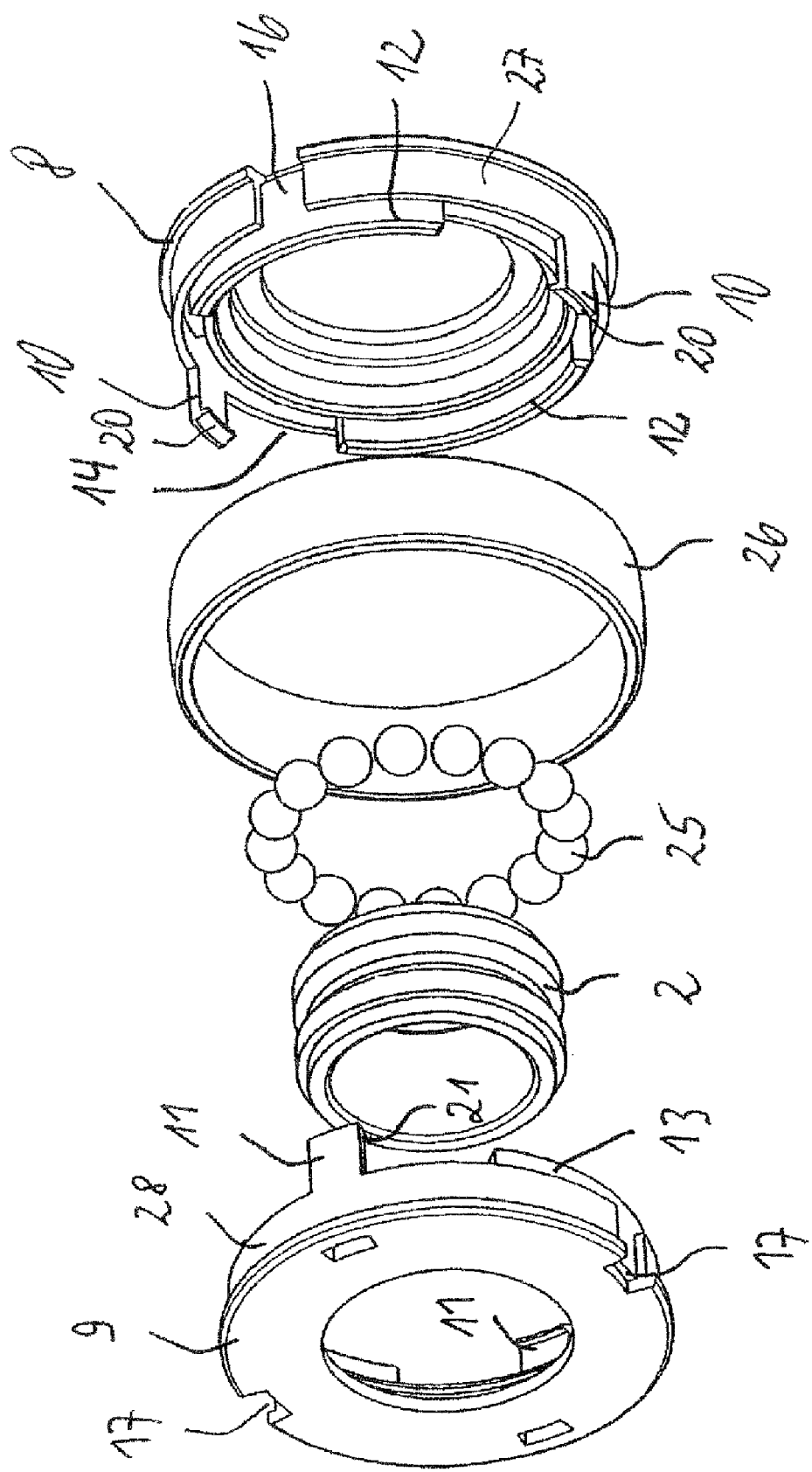
FIG. 7 shows a perspective representation of the bearing arrangement as shown in FIG. 5, including bearing balls, before the snapping together of the individual component parts.

The rolling bearing 24 represented as a whole and in its individual constituent parts in FIGS. 5 to 7 is formed as a four-point ball bearing, the bearing outer ring 3 of which is made up of the two ring halves 8, 9, which in the assembled state lie against one another at the parting plane 23. As can be seen, formed in one piece on the ring parts 27, 28 are the latching members 10, 11, the hooks 20, 21 of which are directed radially inward, with the latching members 10, 11 lying opposite one another when viewed in the circumferential direction. The ring parts 27, 28 are interrupted at two opposing circumferential points by clearances 16, 17, in which latching members 11, come into abutment after assembly of the two ring halves 8, 9 has taken place. Segment-like and shell-shaped projections 12, 13 project in the axial direction beyond the ring parts 27, 28 at a part of the circumferential extent thereof, the projections 12, 13 being arranged in a different radial plane than the ring parts 27, 28, i.e. the projections 12, 13 are offset radially inward with respect to the ring parts 27, 28. In turn, the shell-like projections 12 of the ring half 8 interact with the depressions 15 of the ring half 9 and the shell-like projections 13 of the ring half 9 interact with the depressions 14 of the ring half 8.

The rolling bearings 1 and 24 described above and represented in the drawings are produced entirely from plastic and, in particular on account of their resistance to media and antimagnetic properties, are in demand in the medical sector and the food industry. They have a high basic load rating and run very smoothly and can be produced in a simple way by injection-molding technology, their design being chosen such that both ring halves 8, 9 have an identical form and they can be demolded in the radial direction without slides, which makes them much easier to produce. A further advantage is provided by the fact that the parting plane 23 of the two ring halves 8, 9 lies outside the raceway region of the rolling elements 4, 5, 25, so that ridges that inevitably occur at the parting locations are not rolled over. It is also advantageous that the latching members 10, 11 reliably and exactly keep the two identically formed ring halves 8, 9 in a correspondingly predetermined juxtaposition in relation to one another. Furthermore, it is advantageous that the flanges 18, 19 of the ring halves 8, 9 have the effect of forming a gap seal, which has a lifetime-prolonging effect. If the rolling bearings 1, 24 are used as rollers, the specific configuration of the latching members 10, 11 is of particular significance, since, by way of their slope, after the assembly of the bearing 1, 24 on a pin they push the ring halves 8, 9 axially together and consequently restrict the bearing play. Finally, the elastic casing 26 and the O-rings 7 ensure that, in combination with a soft outer running surface, a roller with a great load-bearing capacity and great vibration and noise damping is obtained.

DESIGNATIONS

1 Double-row angular ball bearing
2 Bearing inner ring
3 Bearing outer ring
4 Rolling element
5 Rolling element
6 Projection
7 O-ring
8 Ring half
9 Ring half
10 Latching member
11 Latching member
12 Shell-like projection
13 Shell-like projection
14 Depression
15 Depression
16 Clearance
17 Clearance
18 Flange
19 Flange
20 Hook
21 Hook
22 Bearing axis
23 Parting plane
24 Four-point ball bearing
25 Rolling element
26 Casing
27 Ring part
28 Ring part
α Angle of inclination

The invention claimed is:

1. A rolling bearing, comprising:
a bearing inner ring and a bearing outer ring, at least one of which is formed as a plastics injection molding, and
rolling elements, which roll on a raceway of the bearing inner ring and on a raceway of the bearing outer ring, at least one of the bearing rings being split in an axially normal parting plane into two ring halves of identical shape, which are held against one another with a form fit, elastically formed latching members which protrude beyond the parting plane and are formed in one piece on the two ring halves interacting with clearances arranged in the two ring halves,
wherein the latching members are formed on a radially inner ring part or a radially outer ring part, a segment-like projection and a shell-shaped projection projecting in an axial direction beyond the ring part at a part of a circumferential extent thereof, and the segment-like projection and the shell-shaped projection being arranged in a different radial plane and being delimited in a circumferential direction by segment-like depressions, and the segment-like projection and the shell-shaped projection of one of the two ring halves engaging in the depressions of a complementary form of the other of the two ring halves, so that the segment-like projection and the shell-shaped projection and the ring part overlap in the axial direction and the latching members of one of the two ring halves engages in clearances arranged in the other ring part.

2. The rolling bearing of claim 1, wherein the bearing outer ring is split, the ring part of each of the two ring halves being provided at two opposing circumferential points with the latching members which engage in the clearances of a complementary form of the other ring parts and the two ring halves being arranged offset in relation to one another in the circumferential direction by 90°.

3. The rolling bearing of claim 2, wherein each of the two ring halves has a radially inwardly directed flange, so that a gap seal is formed with the bearing inner ring.

4. The rolling bearing of claim 2, wherein the rolling bearing is formed as a four-point ball bearing, the rolling elements of which are arranged as a full complement.

5. The rolling bearing of claim 2, wherein the two ring halves have an elastically formed casing between them at outer circumferential surface.

6. The rolling bearing of claim 1, wherein the bearing inner ring is split, the ring part of each of the two ring being provided at two opposing circumferential points with the latching members which engage in the clearances of a complementary form of the other ring part and the two ring halves being arranged offset in relation to one another in the circumferential direction by 90°.

7. The rolling bearing of claim 6, Wherein each of the two ring halves have a radially outwardly directed flange, so that a gap seal is formed with the bearing outer ring.

8. The rolling bearing of claim 6, wherein the rolling bearing is formed as a double-row angular ball bearing, the rolling elements of which are arranged as a full complement.

9. The rolling bearing of claim 6, wherein the bearing outer ring has at least one recess in which an O-ring is arranged.

10. The rolling hearing of claim 1, wherein the latching members each have a hook, a latching area of which runs at an angle of <90° with respect to a bearing axis and which interacts with an identically inclined latching area of the clearances.

11. The rolling bearing of claim 1, wherein the rolling elements are produced from a non-metallic material.

* * * * *